(No Model.) 3 Sheets—Sheet 1.
J. G. HODGSON.
SOLDERING MACHINE.
No. 422,412. Patented Mar. 4, 1890.
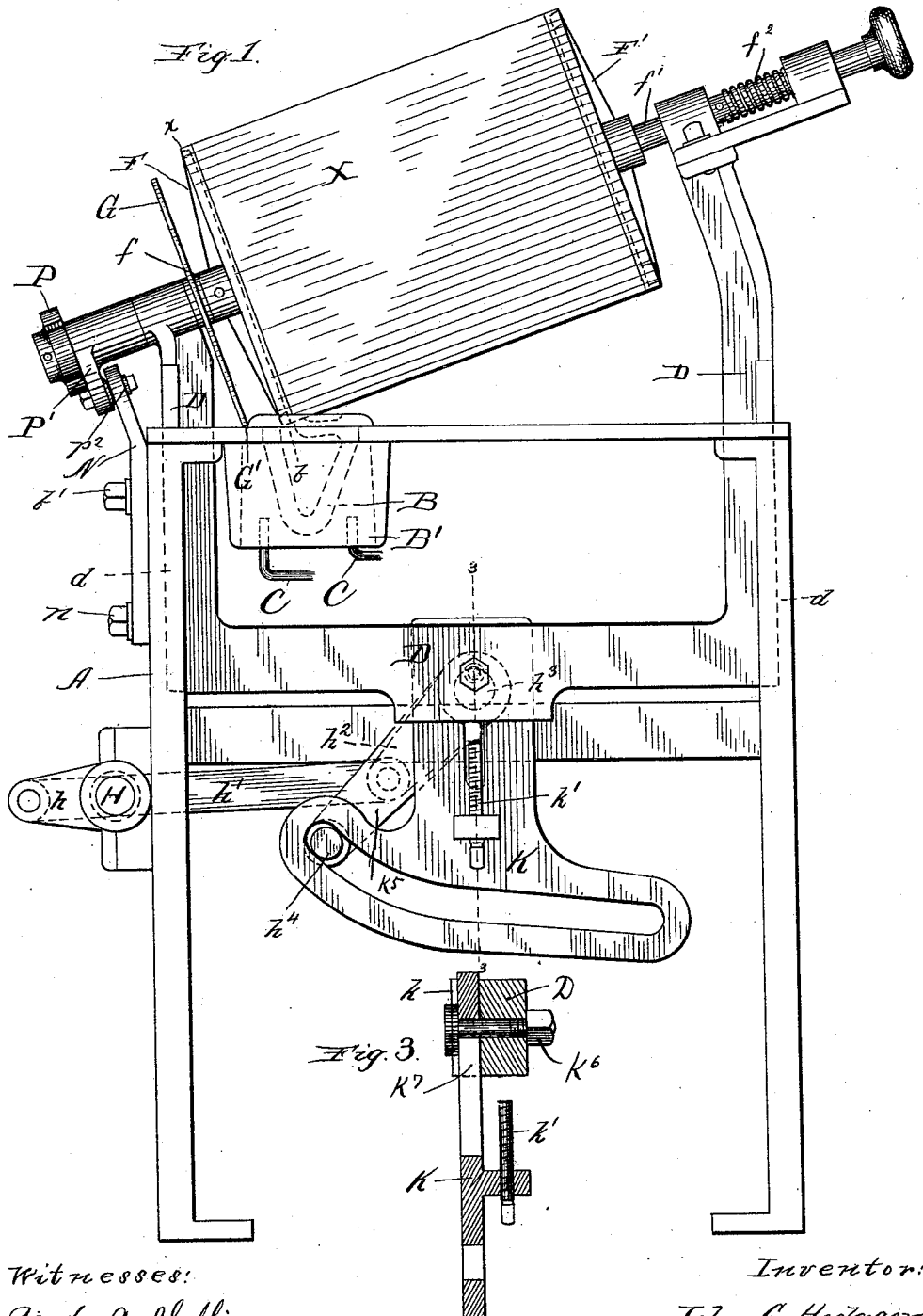

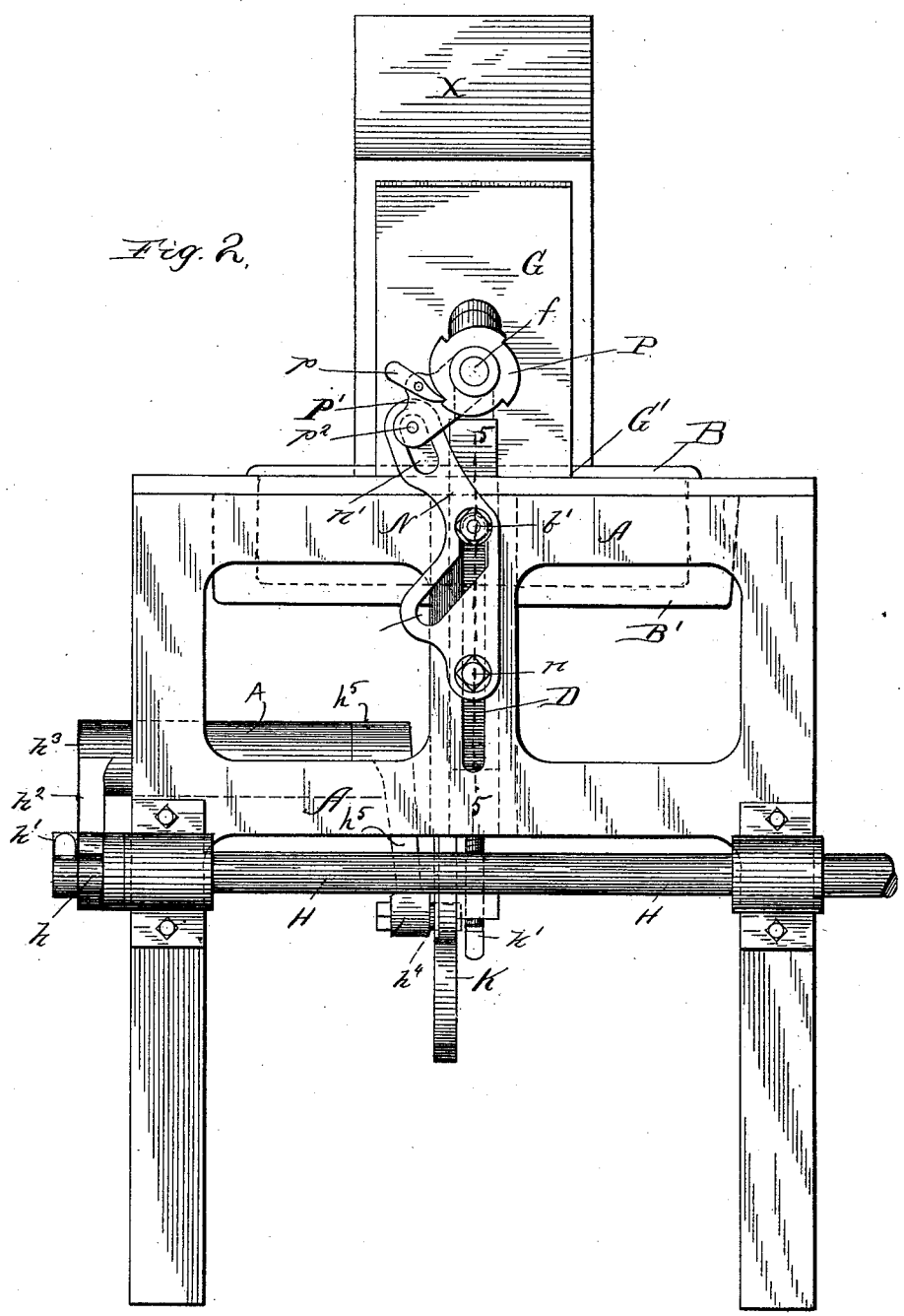

(No Model.) 3 Sheets—Sheet 3.
J. G. HODGSON.
SOLDERING MACHINE.
No. 422,412. Patented Mar. 4, 1890.
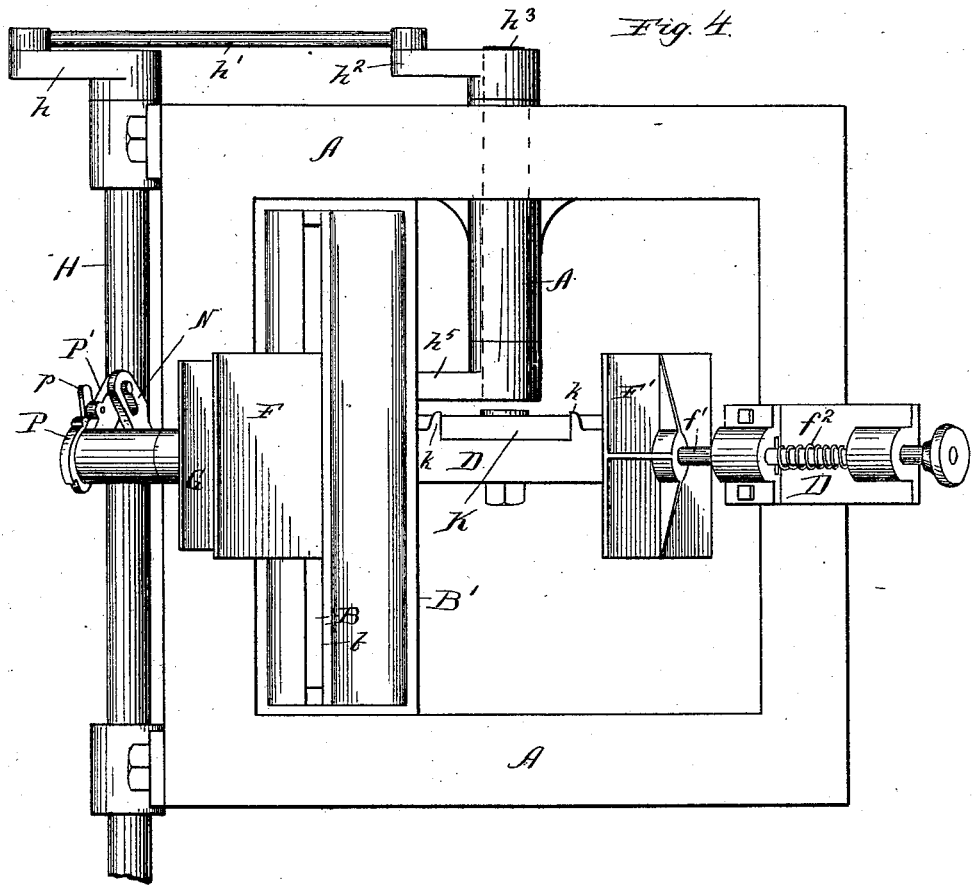
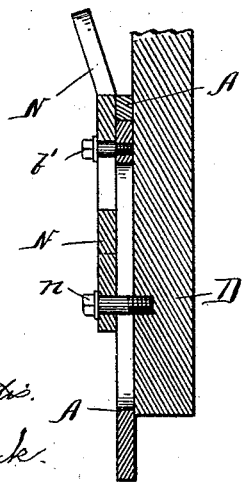
Witnesses:
Lew. E. Curtis.
Emma Hack.
Inventor:
John G. Hodgson
By Munday, Evarts & Adcock
His Attorneys.

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

SOLDERING-MACHINE.

SPECIFICATION forming part of Letters Patent No. 422,412, dated March 4, 1890.

Application filed April 6, 1889. Serial No. 306,182. (No model.)

*To all whom it may concern:*

Be it known that I, JOHN G. HODGSON, a citizen of the United States, residing in Maywood, in the county of Cook and State of Illinois, have invented new and useful Improvements in Can-Soldering Machines, of which the following is a specification.

My invention relates to improvements in can-soldering machines, and more especially to improvements in machines for soldering the end seams of square or flat sided shaped cans by revolving them in a bath of molten solder.

My invention consists in the combination, with a solder-bath mounted upon a suitable frame, of a vertically-reciprocating can-holder the shaft or spindle of which is provided with a former corresponding in shape to the can being soldered, and which former engages a stop or guide on the frame of the machine, and thus governs or regulates the position of the seam in respect to the molten-solder bath in which it is immersed as the can revolves during the soldering operation.

My invention also consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a device embodying my invention. Fig. 2 is a front view, and Fig. 3 is a detail vertical section on line 3 3 of Fig. 1. Fig. 4 is a plan view, and Fig. 5 is a section on line 5 5 of Fig. 2.

In the drawings, A represents the frame of the machine, which may be of any suitable construction adapted to give bearing and support to the other parts.

B is the solder bath, or vessel containing the molten solder. It is secured rigidly to the frame A. This vessel B is provided with a narrow slot-shaped opening $b$ at its top, just wide enough to receive the corner of the can and immerse the seam in the molten solder. By thus furnishing the molten-solder vessel with only a narrow opening at its top oxidation of the solder by contact with the air is largely prevented. The solder-vessel B is also furnished with depending flanges or shields B', for confining the heat around the solder-vessel from the burners or heating devices C.

D is a vertically-reciprocating can-holder frame mounted to slide in suitable guides $d$ on the main frame A. The can holders or chucks F F', or their shafts $f f'$, are journaled on the sliding frame D at an angle to the horizontal, so that the corner or seam $x$ of the can X may project into the molten solder, preferably about as indicated in Fig. 1.

G is the former, corresponding in shape to the can to be soldered. This former G is secured to the can-holder disk F or to its shaft $f$. The can-holder F' or its shaft $f'$ is furnished with a spring $f^2$, by which the can is clamped between the holders F F'. The can-holder disks F F' should be made somewhat smaller than the cross-section of the can to be soldered, so that the edge or corner of the holder F will not project into the solder. These holder-disks F F' are also shaped to correspond to the countersink in the heads of the can, as indicated by dotted lines in Fig. 1. The revolving former G engages a stop or guide G' on the frame of the machine or on the solder-vessel B, and thus governs or regulates the depth to which each edge or seam of the can shall be immersed in the solder, and also supports the weight of the can and can-holder during the soldering operation, so that the can will be subjected to no strain.

H is the driving-shaft of the machine, which is furnished with a crank $h$, connected by a link $h'$ with a crank or swinging arm $h^2$, pivoted at $h^3$ to the frame A of the machine. K is a sliding cam mounted to reciprocate in suitable guides $k$ on the sliding can-holder frame D. A bolt $k^6$, passing through a hole in the sliding frame D and through a slot $k^7$ in the sliding cam K, serves to hold the cam K in place in its guide as it moves up and down in respect to the frame D. The vertically-sliding cam K is furnished with an adjustable screw-stop $k'$, which engages the sliding can-holder frame D, so that the upward movement of the cam K will raise the can-holder frame D sufficiently to permit the can-holder and can to revolve. The crank or swinging arm $h^5$ on the inner end of the shaft $h^3$ is furnished with a pin or roller $h^4$, which engages the cam K, and thus moves the same up and down.

The can-holder F F' is revolved by means of a cam-lever N, pivoted at $n$ to the sliding frame D and vibrated by a pin or roller $b'$, secured to the main frame A, and which works in the slotted cam-lever N. The shaft $f$ is furnished with a ratchet P, having as many teeth as there are sides or faces to the can to be soldered. This ratchet is actuated by a pawl-arm P', furnished with a pawl $p$, the arm P' being connected by a pin $p^2$ with the cam-lever N. The pin $p^2$ fits in a slot $n'$ in the cam-lever N.

In operation a can, as X, being placed in the inclined revolving can-holder F F', the upward movement of the cam K raises the can-holder frame D, so that the can-holder may be revolved to bring one of the edges or seams of the can parallel to the surface of the molten solder in the vessel B. As the cam-slide K moves downward, the can-holder frame D rests on the screw $k'$ until the former G strikes the guide or stop G'. The edge or seam of the can is thus immersed to the proper depth in the molten solder, thus soldering one seam or edge of the can. The upward movement of the cam-slide K now raises the frame D, thus moving the can out of the solder and away from the solder-bath, so that the can-holder may be revolved by the cam-lever N, and pawl and ratchet operated thereby. By these means the inclined can-holder is moved up and down and revolved, as required, to permit its corners to pass the solder-vessel. The can may thus be revolved one, two, three, or more times in the solder bath, as desired, until one end or head of the can is soldered, and then the can is turned end for end and its other head soldered in the same way.

I claim—

1. The combination, with a solder bath, of a vertically-reciprocating can-holder frame mounted in suitable guides on the main frame, an inclined revolving can-holder journaled on said can-holder frame, a former secured to and revolving with said can-holder, and a stop or guide engaging said former, substantially as specified.

2. The combination, with a frame A, of solder bath B, vertically-reciprocating can-holder frame D, inclined can holder or chucks F F', former G, guide or stop G', mechanism for reciprocating said can-holder frame D, and mechanism for revolving said can-holder, substantially as specified.

3. The combination, with the main frame A, of solder bath B, sliding can-holder frame D, cam K, mounted to slide on said frame D, and furnished with an adjustable stop $k'$, engaging said frame D, inclined revolving can-holder F F', former G, and guide or stop G', substantially as specified.

4. The combination, with frame A, of solder bath B, vertically-sliding can-holder frame D, sliding cam K, having screw-stop $k'$, driving-shaft H, crank $h$, link $h'$, swinging arm or crank $h^2$, for actuating said cam K, revolving inclined can-holders F F', having spindle $f f'$, former G, guide G', ratchet P, pawl-arm P', carrying pawl $p$, and cam-lever N, actuated by said slide D, for operating said ratchet to revolve the can-holder, substantially as specified.

5. The combination, with frame A, of solder bath B, stationary revolving can-holder chuck F, spring-actuated revolving chuck F', revolving former G, and stop or guide G', substantially as specified.

JOHN G. HODGSON.

Witnesses:
H. M. MUNDAY,
EDMUND ADCOCK.